United States Patent [19]

Morey

[11] Patent Number: 4,589,032

[45] Date of Patent: May 13, 1986

[54] ULTRA LOW POWER VIDEO AMPLIFIER

[75] Inventor: William A. Morey, Marion, Iowa

[73] Assignee: Rockwell International Corporation, El Segundo, Calif.

[21] Appl. No.: 596,888

[22] Filed: Apr. 5, 1984

[51] Int. Cl.[4] .................. H04N 5/68; H04N 5/14; H04N 5/34

[52] U.S. Cl. .................... 358/242; 358/184

[58] Field of Search ............ 358/184, 73, 242; 328/187; 307/517, 263, 246; 340/723, 742; 315/30

[56] References Cited

U.S. PATENT DOCUMENTS 4,494,146  1/1985  Naimpally et al. ............ 358/242

Primary Examiner—John C. Martin
Assistant Examiner—Howard L. Carter
Attorney, Agent, or Firm—Robert C. Mayes; George A. Montanye; H. Fredrick Hamann

[57] ABSTRACT

A logic signal controlled switching video amplifier is disclosed having minimal power dissipation. By utilizing diode and transistor amplifier switching techniques, charging and discharging currents in the video amplifier are controlled. The stray capacitance associated with circuit wiring and cathode ray tube interelectrode capacitance can be rapidly switched without requiring low impedances or high DC current levels in the video amplifier.

3 Claims, 1 Drawing Figure

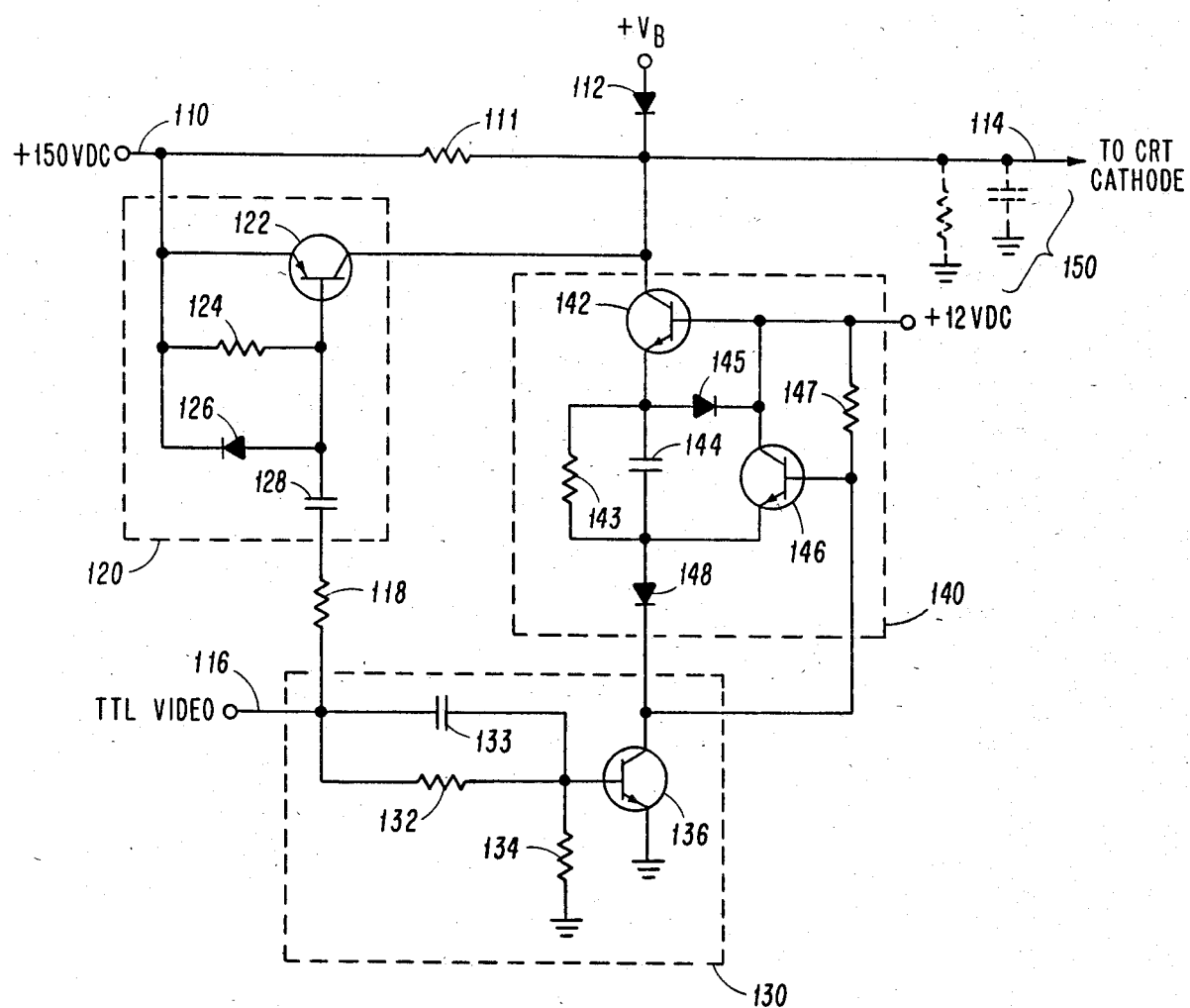

ULTRA LOW POWER VIDEO AMPLIFIER

BACKGROUND OF THE INVENTION

The present invention relates to electronic amplifiers in general, and more particularly, to low power video amplifiers.

A variety of specialized video amplifiers have been utilized in the art to provide a switch control interface between the display controller, of a digitally operated unit, for example, and the cathode of a cathode ray tube. The high voltage requirement for typical cathode ray tube electron beam guns mandates a significant voltage controlling capability. Additionally, and essentially in contradiction to this voltage handling requirement, the video amplifier is required to have a significant switching speed capability, in response to ever-increasing requirements for resolution and graphic clarity on the display.

These two conflicting requirements are met in some applications by utilizing a power transistor in series with a series resistor having a typical value of 1 kOhm. A variable brightness control transistor may be, in one embodiment, located between the series resistor and control transistor to control the voltage level of the electron gun, which controls the CRT brightness. This configuration has its limitations in that the series resistance must be of a relatively low value in order to obtain sufficient response at the cathode. Also, the same low value resistance results in a significantly higher power dissipation during ON conditions than is desirable, and as a direct result of the significant power consumption utilizing this low series resistance, heat buildup problems, bulk required by cooling fins, and weight problems, must also be addressed.

A second problem with this prior art series control technique is the inability to effectively offset the inherent capacitance in the wiring harness of the CRT and the interelectrode capacitance. As the ON/OFF speeds for the video amplifier increase, these stray capacitances become significant and therefore pose a practical limit for the maximum switching speed attainable with the series video amplifier control technique.

SUMMARY AND BRIEF DESCRIPTION

Accordingly, it is an object of the present invention to provide a video amplifier circuit having an improved switching speed capability and a reduced power dissipation characteristic.

Another object of the present invention is to provide an improved video switching amplifier having the same improved switching speed characteristic and reduced power consumption requirement, and also the capability to respond to subsequent ON and OFF control signals, provided at increased speed, without significant video distortion.

Briefly, and in accordance with the present invention, a video amplifier circuit is disclosed comprising in combination, an amplifier circuit means responsive to a logic input for providing a control video signal output, first means coupled to the circuit means for accelerating the response to an ON condition at the output, second means coupled to the circuit means for accelerating the response to an OFF condition at the output, and third means, a portion thereof coupled to the first means and a second portion thereof coupled to the second means, for accelerating the recovery of the circuit means to the responsive ON and OFF condition at the output, thereby improving the response for subsequent logic inputs. This is accomplished, in one embodiment, by utilizing a current sinking capability to draw stored charge in the stray capacitance of the cathode circuitry out of the cathode in response to an ON condition; and an amplified shunt coupled current source to quickly recharge the stray cathode circuitry capacitance in response to an OFF condition. The response for subsequent logic inputs is improved by including diodes, one each for the sinking means and for the current source means, coupled base-to-emitter, thereby allowing rapid current discharge subsequent to device activation, and a rapid return to a stable state.

A video amplifier circuit therefore, constructed in accordance with the present invention, comprises in combination, a video power connection, and an output for connection to a CRT cathode, and having a series resistor coupled therebetween having a resistive value greater than 120 kOhms, further comprising: a shunt connected amplifier means in cooperation with the resistor for controlling the output current of the amplifier in response to a TTL control signal, and accelerated turn OFF circuit coupled to the output for charging inherent and stray capacitance in the CRT output, and an input control circuit for receiving the TTL control signal and coupled to the shunt amplifier means and the accelerated turn OFF circuit.

The actual construction of one embodiment constructed in accordance with the present invention is detailed below with reference to the drawing in which a schematic circuit diagram is shown for a typical video amplifier application as used in an in-line gun CRT.

DETAILED DESCRIPTION

Referring now to the drawing, a specific circuit is shown as an operational exemplary embodiment as constructed to obtain the objectives described herein. The specific values for components described hereinbelow provide a detailed description of one operational embodiment, although it can be readily seen that substitutions and modifications may be made as required in different applications. This circuit is specifically designed for use in an in-line cathode ray tube. Polarities and voltage potentials may readily be modified for use of this basic circuit technique in delta gun tubes, as well.

The high voltage 150 VDC input connection 110 is coupled through series resistor 111 to the CRT cathode connection output 114. The stray wiring capacitance, interelectrode capacitance, and leakage resistance 150 are shown coupled to output 114. The brightness control connection is diode-coupled through diode 112 to the output voltage produced on output 114. Resistor 111 is a 220 kOhm resistor and is shunt coupled to transistor 122 (a 2N3637 commercially available transistor having a typical gain ratio of 20 to 30). Transistor 122 is selected such that the $V_{ce}$ and $V_{bc}$ are capable of handling the high voltage input at 110 to low voltage at the CRT cathode when ON in a typical application.

Thus, the circuitry in block 120 handles the OFF function of the video amplifier in response to a voltage signal input from block 130, across resistor 118 (100 ohms). Capacitor 128 (220 pf), in combination with the gain of transistor 122, provides an extremely rapid turn-OFF capability for the amplifier and additionally isolates the high DC voltages of the amplifier stage from the TTL video signal stage in block 130. Resistor 124

(2.7 kOhms) is coupled base-to-emitter to insure proper $V_{be}$ level bias for transistor 122 during operation.

The current sinking circuit 140 operates to rapidly draw charge from output 114 when an ON signal is received as follows: transistor 142 as well as the remaining components within circuit block 140 are quiescent during the OFF state (logic signal "0" at TTL input 116). When, however, a "1" ON signal is received at the TTL video input 116, capacitor 133 (100 pf) is a speedup capacitor injecting charge to the base connection of transistor 136 (2N2369A). This in turn allows a rapid voltage decrease on the collector of transistor 136, a turn-OFF of transistor 146 (2N2369A), and an increase in the $V_{be}$ for transistor 142 (2N3440 level shifting transistor) resulting in the turn-on of that device.

The turn-on of transistor 142 results in the stored charge of the stray and interelectrode capacitance of the CRT output circuitry to be diverted out of the wiring harness and essentially into capacitor 144. It can therefore be seen that capacitor 144 should be selected proportionately to obtain desired value of switching speeds dependent on interelectrode capacitance of the CRT cathode circuitry. Capacitor 144 in this exemplary embodiment is 440 pf and was found to operate well for a typical in-line cathode ray tube configuration. The minimum value for capacitor 144 is calculated as is shown in the following formula:

$$\frac{C_{150} dV_{out}}{dt} = C_{144} \frac{[12 - (V_{be(142)} + V_{D(148)} + V_{ce(136)})]}{dt}$$

Thus, for a $dV_{out}$ of approximately 25 volts, and the $V_{be}$ for transistor 142 plus the $V_{d148}$ plus $V_{ce}$ for transistor 136 being approximately equal to 2 volts in the present embodiment, the minimum capacitor value for capacitor 144 is approximately 2.5 times the stray capacitance 150.

Diode 148 (1N5711) blocks the higher voltage at the collector of transistor 136 from the negative side of capacitor 144 during the period immediately following a turn-OFF condition. Diode 145 (1N5711) allows the rapid discharge of capacitor 144 thorugh transistor 146, thereby accelerating the return of circuitry 140 to a stable condition after a current sinking function, in anticipation of receiving subsequent ON and OFF inputs. Similarly, diode 126 (1N5711) provides a rapid discharge of capacitor 128 to the circuit input 110 immediately subsequent to a turn-ON condition, in anticipation of a subsequent OFF video signal input.

Thus, the capacitor 128 in combination with transistor 122 are utilized to quickly turn OFF the video amplifier apparatus despite relatively large impedance 111 in the amplifier output. The gain of transistor 122 reduces the required value for capacitor 128 to effectively offset the stray and interelectrode capacitance observed at the CRT cathode output 114. In accelerating the ON condition for the video amplifier, capacitor 144 is essentially matched to the 2.5 times observed capacitance at the CRT cathode output 114 and is switched through transistor 142 to sink the stored charge in the output in response to an ON signal at the TTL video input 116. Resistors 132 (4.7 kOhms) and 134 (10 kOhms) provide proper bias for the base of transistor 136. Resistor 143 (4.7 kOhms) provides proper bias current for diode 112. The $V_B$ is a brightness level "stiff" voltage source which clamps, through diode 112, the output at a specified lower voltage level desired for a desired brightness level.

Although the invention has been described with respect to a specific preferred embodiment thereof, it will be understood that variations and modifications can be made within the scope of the invention by those skilled in the art. Therefore, it is intended that the appended claims be interpretted as broadly as reasonably permitted by the prior art to include all such variations and modifications within the scope of the present invention.

I claim:

1. A video amplifier circuit comprising, in combination:
   a. an amplifier circuit means responsive to a logic input for providing a control video signal output;
   b. first means, coupled to said circuit means, for accelerating said response to an ON condition at said output;
   c. second means, coupled to said circuit means, for accelerating said response to an OFF condition at said output; and
   d. third means, a portion thereof coupled to said first means and a second portion thereof coupled to said second means, for accelerating the recovery of said circuit means to said responsive ON and OFF conditions at said output, thereby improving said response for subsequent logic inputs.

2. A video amplifier circuit comprising, in combination, a video power connection, and an output for connection to a CRT cathode, and having a series resistor coupled therebetween having a resistive value greater than 100 kOhms further comprising:
   a. a shunt connected amplifier means, in cooperation with said resistor, for controlling the output current of said amplifier in response to a TTL control signal;
   b. an accelerated turn-off circuit coupled to said output for charging inherent and stray capacitance in said CRT output; and
   c. an input control circuit for receiving said TTL control signal and coupled to said shunt amplifier means and said accelerated turn-off circuit.

3. A video amplifier circuit for an in-line cathode ray tube comprising, in combination:
   a. a voltage supply input having sufficient potential to turn OFF said in-line gun, and a second voltage input, lower than said first, for controlling the output potential applied to said in-line gun when ON;
   b. a resistor disposed intermediate said first and said second voltage supply inputs, having a value greater than 100 kOhm;
   c. a transistor logic signal input circuit for receiving ON and OFF control signals to said amplifier;
   d. an accelerated turn-OFF circuit, responsive to said transistor logic signal, and coupled to said input for shunting current from said first voltage input to said second voltage input, and coupled thereto; and
   e. an accelerated turn-ON circuit having a sink capability operable in response to an ON signal, to draw stored charge from said cathode output, all of said structure comparatively interconnected.

* * * * *